United States Patent Office 3,527,701
Patented Sept. 8, 1970

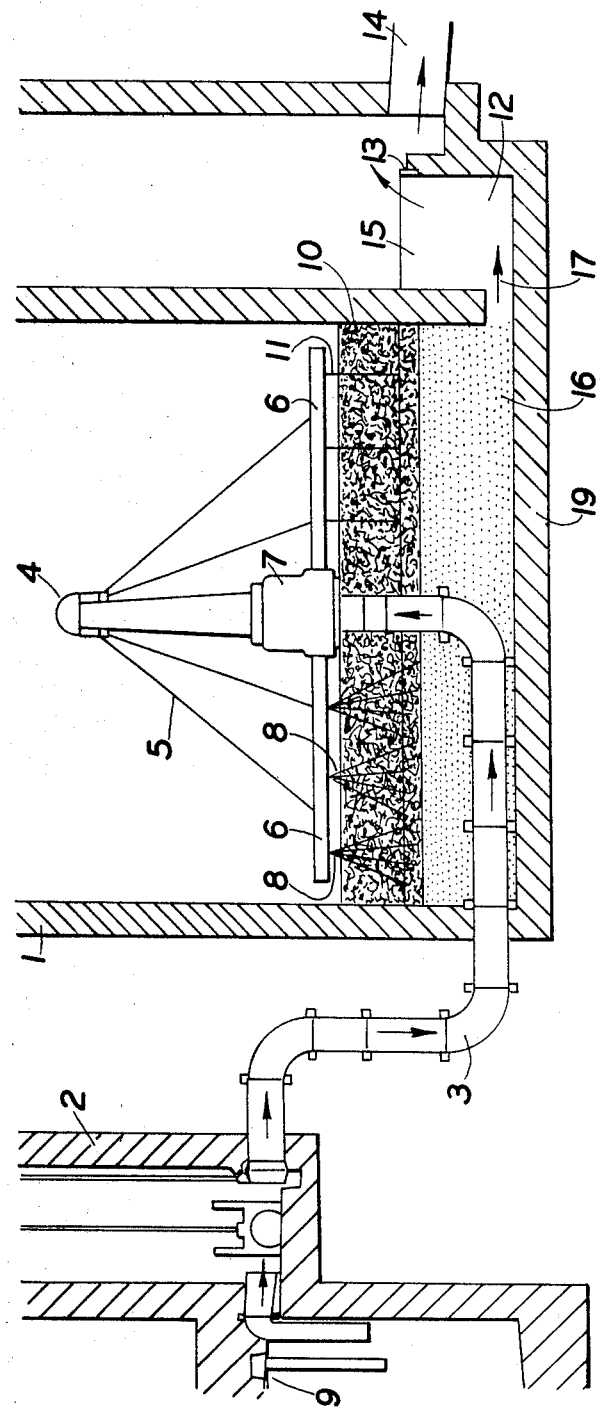

3,527,701
METHOD AND APPARATUS FOR TREATING LIQUIDS CONTAMINATED WITH HYDROCARBONS COMPOUNDS
Walter Weiler, Diez (Lahn), Germany, assignor to Passavant-Werke, near Michelbach, Nassau, Germany, a corporation of Germany
Filed June 11, 1968, Ser. No. 736,104
Claims priority, application Germany, June 14, 1967, P 42,369
Int. Cl. B01d 17/04
U.S. Cl. 210—40
15 Claims

ABSTRACT OF THE DISCLOSURE

Apparatus for spraying a liquid containing hydro-carbons, such as oil, under high pressure onto a filter made of particles containing an oleophilic compound, thoroughly mixing the liquid with the filter compound to remove the hydro-carbon compounds and then removing the the cleansed liquid.

BACKGROUND OF THE INVENTION

This invention relates to the separation of the constituents of a liquid and, more particularly, to the removal of hydrocarbons such as benzene, gasoline and oil from polluted water.

It is known that conducting a liquid containing hydrocarbons through a filter containing an oleophilic compound will effect separation of the hydro-carbons from the water because of its selective absortion characteristics for oil, benzene and other similar hydro-carbons.

Other methods of separation operate by utilizing the fact that hydro-carbons are lighter than water and will rise to the surface of a relatively quiescent body so separation can be effected by skimming. However, this method removes only about 95 percent of the hydro-carbons present and to meet some purification standards, further treatment is necessary.

With previous filters incorporating an oleophilic compound, efficiency, capacity and, ultimately, the life of a filter is diminished because of a tendency to clog, fill up and create pockets of untreated liquid. Besides the obvious operational inefficiencies of such equipment, additional expense is incurred initially because the filter must be over designed to allow for the decreased steady-state operation capacity.

SUMMARY OF THE INVENTION

This invention virtually eliminates clogging in the filter so that it is utilized to a maximum degree on a continuous basis.

A filter packing formed of particles containing an oleophilic compound such as charcoal, bituminous coal, inflated mica material or vulcanic tufaceous limestone is placed in a supporting bed with an outlet beneath the packing. A plurality of high pressure liquid nozzles are movably mounted above and proximate to the filter packing surface. These nozzles project a jet of liquid, which may have previously been run through a skimming separator of the type previously mentioned, onto the filter packing with force sufficient to joggle the filter particles to cause a slow, steady shift and circulation of the filter as a whole which prevents pockets of stagnant liquid from forming, promotes the exposure of the surface areas of the entire filter to incoming liquid and provides a pressurized contact between the pollutants and filter media.

To facilitate contact between liquid and filter, the outlet can be dammed to maintain a desired level and degree of saturation. The dammed liquid also makes it easier to mix and circulate the filter material under the power of the nozzle jets. In addition, it assures uniform filtering conditions, even when the incoming liquid supply is unsteady.

The filter packing material may be of a type that floats or sinks in water. In the latter case, a coarse grained, porous material such as gravel is used to support the filter and allow easy drainage.

It is, therefore, an object of this invention to provide a liquid purification filter having high through-put capacity while maintaining superior pollutant removal ability.

Another object of this invention is to provide a liquid purification filter wherein the contact between the filter material and pollutants is maximized by continuously circulating the liquid.

It is a feature of this invention to use high pressure nozzle jets to distribute the polluted liquid and mix and circulate it with the filter media.

An additional feature is to provide a dammed outlet for maintaining a predetermined liquid level within the filter.

Other desirable features, advantages and characteristics will become apparent to those having ordinary skill in the art as the following detailed disclosure of a preferred embodiment is read in view of the accompanying drawing which forms part of the disclosure.

BRIEF DESCRIPTION OF THE DRAWINGS

The figure is a cross sectional elevational view of a circular tank showing the inlet from a skimming separator, the liquid being discharged into the filter packing and a dammed outlet connected to the bottom of the filter.

DESCRIPTION OF THE PREFERRED EMBODIMENT

A separator 2 is connected to a circular purification tank 1 via pipeline 3. Separator 2 functions by providing a quiescent basin into which water polluted with hydrocarbons such as oil, benzene and gasoline are introduced at level 9. The hydro-carbons, being lighter than water, tend to be displaced upwardly in separator 2 so that the liquid discharged into pipeline 3 is about 95 percent water and 5 percent pollutants and other impurities. This aids the purification process in tank 1 by eliminating large glut portions of hydro-carbons, thus decreasing the filter size required.

Within tank 1, a layer of filter packing 10 is placed on bottom 19. Filter packing 10 preferably consists of granules or small particle formed pieces of material having oleophilic and, preferably, also hydrophobic properties. Oleophilic substances such as charcoal, inflated mica containing minerals and vulcanic tuffaneous limestone are used because of their high affinity for hydro-carbons which are absorbed and separated from the water. Hydrophobic properties aid in the filtering process by not allowing the filter packing compounds to become saturated with water.

Pipeline 3 enters tank 1 at the bottom and turns vertically upwardly near the center and is capped with a rotary coupling 7. A sprinkler 4 having a plurality of radially extending sprinker arms 6, each supported by cables 5 is mounted on coupling 7.

Several nozzles 8 are mounted on the underside of each sprinkler arm 6 and are canted at an angle with a vertical plane to provide vertical and horizontal reactive force components. Water pressure is supplied by either connecting a pump (not shown) to line 3 or making the outlet of pipeline 3 to separator 2 much higher than nozzles 8, or both. Regardless of the method, sufficient water pressure is developed to turn the sprinkler with the reactive forces from the liquid jets emerging from the nozzles. The force of the jets impinging on the filter packing particles is sufficient to cause agitation and movement of the particles as units and circulation of the filter as a whole.

Thus, under the influence of the constantly moving and variably positioned water jets, the entire filter packing and even the portion below the surface, is exposed to fresh incoming untreated water. The movement of the filter particles under the impact of the water jets acts in combination with the fine droplets so produced to provide maximum contact between the hydro-carbons and oleophilic compounds to optimize the filtering process. It is, therefore, possible with a smaller amount of filter packing to achieve results equal or superior to prior filters.

In the event that the design parameters are such that the depth of filter packing 10 is too thick for even high pressure jets to completely mix, a plurality of agitating rods 11 are mounted on sprinkler arms 6 and extend downwardly into the filter particles. As the sprinkler rotates, possibly with the help of a motor (not shown), rods 11 agitate and mix the filter materials. Resistance to the passage of rods 11 is slight because the filter packing components are generally light.

To further enhance the contact and filtering process, a weir-like dam 13 is placed in outlet 17 of tank 1 so that the liquid level 15 within is maintained at a desired level above the bottom level of filter packing 10. To further facilitate uniform contact between the liquid jets and the filter, its components can be made of materials capable of floating in water. In this case, a coarse grained permeable material 16, like gravel, is interposed between the tank bottom 19 and filter packing 10 to allow drainage to outlet 17 but prevent the floating particles from washing away under the impact of the water jets.

Dam 13 allows the steady discharge from outlet basin 12 into discharge pipe 14 to the sewerage system.

Tank 1, including outlet basin 12 and bottom plate 19, can be designed as a compact unit capable of being transported and erected as a unit and is preferably constructed of steel.

In experiments conducted with waste waters polluted with a benzene-gasoline mixture comprising 40 grams per liter of water before introduction into skimming separator 2, and about 0.2 gram/liter as introduced into purification tank 1, this filtering apparatus reduced the benzene-gasoline content to 10 mg./l. at a liquid flow rate of 10 l./sec. per 2 m.$^2$ of filter surface in a filter composed of particles sized from about 0.5 to 5 mm. and having a packing height of about 15 to 20 cm.

While the foregoing is a detailed description of a preferred embodiment of this invention, it is understood that various modification and embodiments may be made without departing from the spirit and scope of the following claims.

I claim:
1. In a process for removing hydro-carbons from a liquid by passing the liquid through a filter packing means formed of particles including an oleophilic compound which has an affinity for hydro-carbons, the improvement comprising: spraying the liquid containing the hydro-carbons to be filtered out onto the filter packing means in a fine jet with force sufficient to agitate the filter packing and improve contact between the hydro-carbons of the liquid and oleophilic compound and thus filtering the hydrocarbons from the liquid by said oleophilic compound.

2. The method of removing hydro-carbons from a liquid as set forth in claim 1, further including the step of: mechanically maintaining the filter packing particles in constant motion.

3. The method of removing hydro-carbons from a liquid as set forth in claim 2, further including the step of: conducting the liquid leaving the filter packing through a heavy coarse grained layer of particles having a greater density than the liquid.

4. The method of removing hydro-carbons from a liquid as set forth in claim 3, further including the step of: damming the liquid above the heavy layer of particles, and wherein said filter packing particles are less dense than the liquid and float therein.

5. The method of removing hydro-carbons from a liquid as set forth in claim 2, further including the step of: damming the liquid leaving the filter packing, thereby saturating the filter packing to ensure optimum contact between the hydro-carbons and oleophilic compounds.

6. The method of removing hydro-carbons from a liquid as set forth in claim 5, wherein: said filter packing particles float in the liquid.

7. The method of removing hydro-carbons from a liquid, as set forth in claim 6, wherein: said filter packing particles are hydrophobic.

8. The method of removing hydro-carbons from a liquid comprising the steps:
(a) separating a portion of hydro-carbons floating on the liquid surface from the remaining portion of the liquid;
(b) finely distributing the remaining portion of liquid containing some hydro-carbons therein under pressure onto a filter packing means including an oleophilic compound having an affinity for hydro-carbons;
(c) continuously agitating the filter packing means to enhance contact between the hydrocarbons of the liquid and said oleophilic compound;
(d) removing the clarified liquid from the filter packing.

9. Apparatus for removing hydro-carbons from a liquid including:
a container means,
a filter packing means in said container means, said packing means having a top and bottom, formed of particles including an oleophilic compound which has an affinity for hydrocarbons;
base means supporting said filter packing means;
sprayer means movably mounted above the top of said filter packing means, said sprayer means positioned to direct said liquid containing said hydro-carbons under pressure in fine jet streams onto and into said filter packing means to improve filtering of hydro-carbons from the liquid by said oleophilic compound;
outlet means beneath the top surface of said filter packing means to remove the clarified liquid.

10. Apparatus as set forth in claim 9, further including: agitator means mounted on said sprayer means and extending into said filter packing means to provide continuous mixing as said sprayer means moves.

11. Apparatus as set forth in claim 9, further including: damming means connected to said outlet means and extending above said base means and the bottom of said filter packing means to maintain said filter packing means substantially saturated in said liquid.

12. Apparatus as set forth in claim 9, wherein: said filter packing means floats in said liquid.

13. Apparatus as set forth in claim 12, wherein: said filter packing means is hydrophobic.

14. Apparatus as set forth in claim 9, wherein:
said base means comprises a coarse grained permeable material heavier than said liquid;
said outlet means is in fluid connection with said base means.

15. Apparatus as set forth in claim 9, wherein:
said sprayer means comprises a plurality of arms rotatably mounted about a vertical axis and positioned to rotate in a substantially horizontal plane;
said sprayer means includes nozzles on each of said arms, said nozzles arrayed in such a manner that the reaction forces of liquid leaving them causes the arms to rotate.

References Cited

UNITED STATES PATENTS

| | | | |
|---|---|---|---|
| 819,358 | 5/1906 | MacDougall | 210—272 X |
| 2,327,726 | 8/1943 | Lose | 210—280 X |
| 3,374,896 | 3/1968 | Palmer et al. | 210—272 |
| 3,424,676 | 1/1969 | Johnson | 210—40 |
| 3,444,077 | 5/1969 | Finch | 210—40 X |

JOHN W. ADEE, Primary Examiner

U.S. Cl. X.R.

210—73, 259, 290